UNITED STATES PATENT OFFICE.

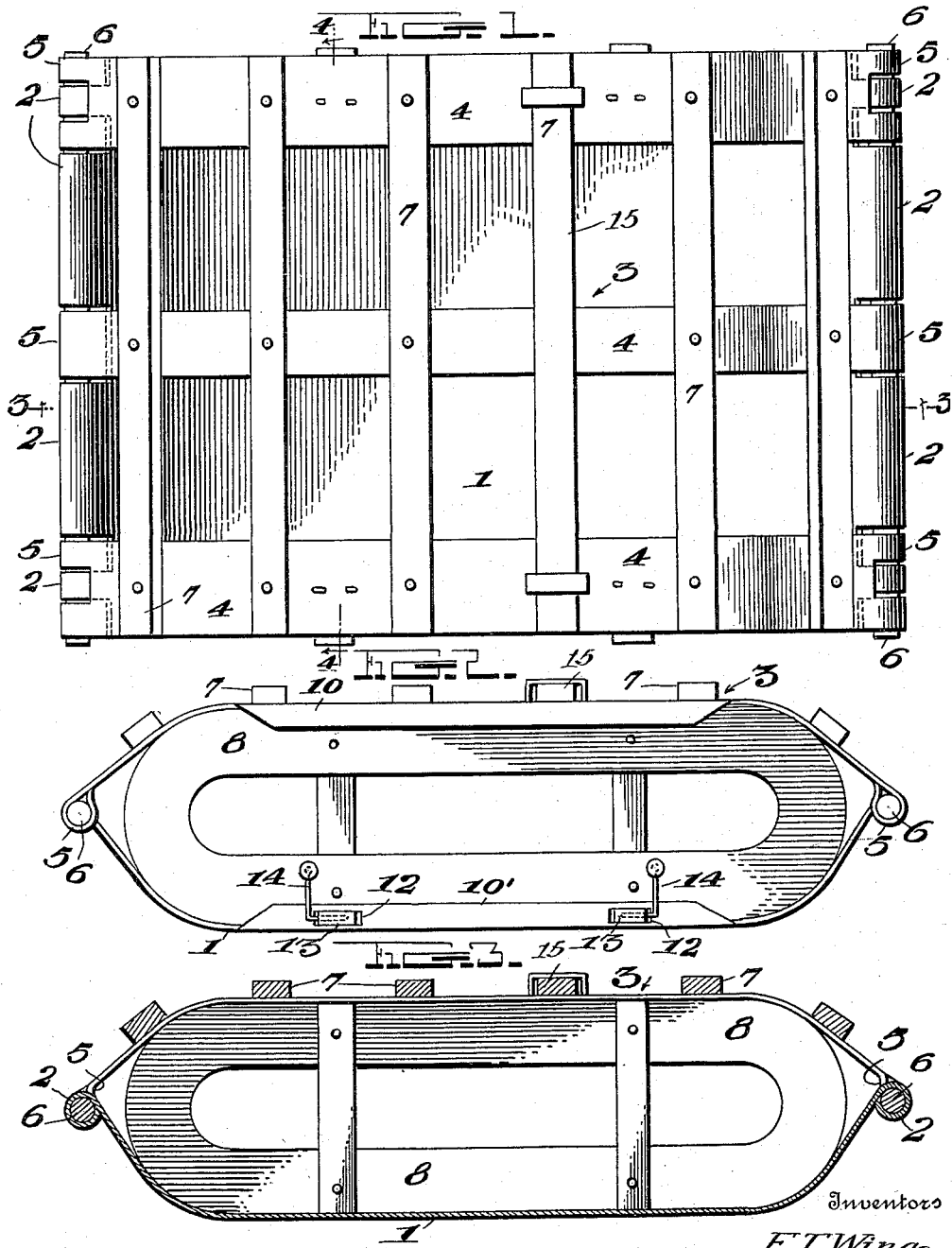

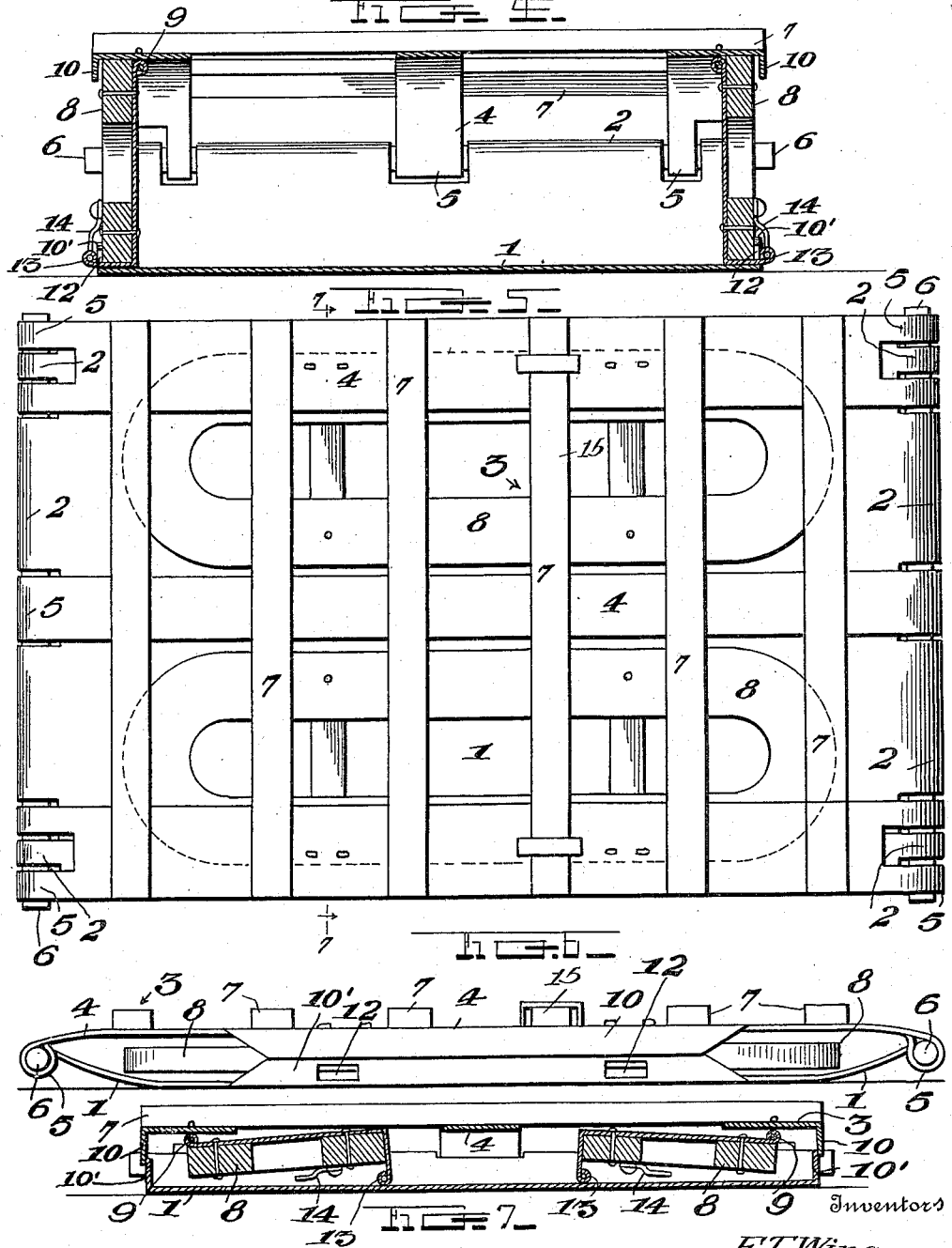

FREDERICK T. WING, OF LINCOLN, AND JOHN DAYTON STIRES, OF COLUMBUS, NEBRASKA; SAID WING ASSIGNOR TO SAID STIRES.

SHIPPING-CRATE.

1,149,011.  Specification of Letters Patent.  Patented Aug. 3, 1915.

Application filed April 13, 1914. Serial No. 831,541.

*To all whom it may concern:*

Be it known that we, FREDERICK T. WING, a citizen of the United States, residing at Lincoln, in the county of Lancaster, State of Nebraska, and JOHN DAYTON STIRES, a citizen of the United States, residing at Columbus, in the county of Platte and State of Nebraska, have invented certain new and useful Improvements in Shipping-Crates; and we do declare the following to be a full, clear, and exact description of the invention, such as will enable others skilled in the art to which it appertains to make and use the same.

This invention relates to new and useful improvements in crates and the invention has for its primary object to provide a novel crate that can be readily folded to occupy a comparatively small space for transportation and storage.

A further object is to provide a crate which is designed for use as a poultry crate.

Still another object is to provide a device which is simple and durable in construction, inexpensive to manufacture and one which will be very efficient in use.

With these and other objects in view our invention consists in the novel features of construction, combination and arrangement of parts as will be hereinafter referred to and more particularly pointed out in the specification and claims.

In the accompanying drawings forming a part of this application:—Figure 1 is a plan view of a device constructed in accordance with our invention. Fig. 2 is a front elevation thereof. Fig. 3 is a vertical section therethrough as seen on line 3—3, Fig. 1. Fig. 4 is a vertical transverse section through the device as seen on line 4—4, Fig. 1. Fig. 5 is a plan view of the device in its folded position. Fig. 6 is a front elevation of the device in such condition, and, Fig. 7 is a transverse section therethrough as seen on line 7—7, Fig. 5.

Referring more particularly to the drawings in which similar reference characters designate corresponding parts throughout the several views 1 designates a bottom for the device formed of a flexible sheet, preferably metal, rectangular in design the ends thereof being provided with a plurality of knuckles 2. In this particular device the end walls are entirely omitted and a top 3 which is provided therefor is connected directly to the ends of the bottom. This top 3 consists of a plurality of longitudinal strips 4 which are also flexible and have the ends thereof formed into knuckles 5 which coöperate with the knuckles 2 at the ends of the bottom 1. A pintle 6 is inserted through each set of knuckles at each end of the device thereby pivotally securing the ends of the top and bottom together and a plurality of cross strips 7 are secured to the upper faces of the longitudinal strips 4 thus completing the formation of said top 3. In view of this particular construction it will be seen that the top may be flattened out upon the bottom so as to form a complete rectangular but flat device. We have provided means, however, for spacing the top from the bottom and to this end rigid side walls 8 are provided the same being hinged as shown at 9 to the under faces of the outer strips forming the top 3. The hinged connection, however, may be provided on the bottom of the device but in any instance these side walls are adapted to fold inwardly with respect to the top and bottom of the crate. The outward swinging movement of these side walls is limited by means of flanges 10 formed on the outer side edge of each of the outer strips of the top and also by flanges indicated at 10′ on the outer side edges of the bottom 1. These side walls 8 have the ends thereof convexed and when disposed to their vertical or set up positions so as to space the top from the bottom, said top and bottom being flexible conform to the outline thereof. These side walls 8 are also slotted or otherwise provided with hand engaging means so as to be readily disposed to their vertical or set up positions when desired and in order to lock the same in such position, the flanges 10′ at the side edges of the bottom 1 are provided with slots 12. Keepers 13 are carried on the side walls and adapted to be received through the slots 12 when said side walls are disposed to their set up positions while hooks 14 are also carried on said side walls for engagement with the keepers when the latter have been disposed through the slots. In this manner it is obvious that when the walls are disposed to their vertical and set up positions the same may be locked or secured in such position and thus secure the complete device in its set up and operative position.

It will be seen from this particular construction that the device when set up has no corners which is extremely advantageous for the cooping of poultry. Furthermore, it will be seen that considerable air space is provided in the device so that the device is entirely sanitary in every respect.

It may be here stated also that one of the cross strips 7 is removably mounted in position this particular strip being indicated at 15. In this manner poultry may be readily introduced into the coop or removed therefrom when desired.

In operation, assuming that the device is entirely set up and it is desired to knock down the same the first operation is the removal of the hooks from the keepers 13. The side walls 8 are then forced inwardly and with the movement thereof inwardly the flexible bottom and top having been forced to their spaced positions with respect to one another, will tend to return to their initial positions. The top will thus be flattened out over the bottom and a comparatively small device presented thus the minimum amount of space will be required to ship or store such devices when empty.

From the foregoing description of the construction of our improved device the manner of applying the same to use will be readily understood and it will be seen that we have provided a crate or coop which is simple and durable in construction, inexpensive to manufacture and thoroughly efficient in use.

While we have particularly described the elements best adapted to perform the functions set forth, it is obvious that various changes in form, proportion and in the minor details of construction may be resorted to, within the scope of the appended claims, without departing from the spirit or sacrificing any of the principles of the invention.

Although the construction of the top and bottom of the crate would give, at first glance, the idea that these parts were flexible, it is to be understood that the inwardly bent flanges 10 and 10' on the top and bottom constitute stiffening means, whereby practically an unbendable top and an unbendable bottom are provided. It is to be understood also that these flanges serve as stops for preventing excessive outward movement of the side walls 8.

Having thus described our invention, what we claim is:

1. A collapsible crate comprising a flexible bottom, a flexible top hingedly connected to the ends of said bottom, rigid side walls hinged to said top and foldable inwardly with respect to said top and bottom, combined stiffening and stop flanges formed on the outer side edges of said top and bottom to limit the outward swinging movement of said side walls, said top and bottom conforming to the outline of said side walls when the latter are disposed to their upright positions, and means for locking said side walls in their upright positions.

2. A collapsible crate comprising a flexible bottom, a flexible top hingedly connected to the ends of said bottom, rigid side walls hinged to the top and foldable inwardly with respect to the top and bottom, combined stiffening and stop flanges formed on the intermediate portions of the side edges of said top and bottom to limit the outward swinging movement of said side walls with respect thereto, the flanges on said bottom being provided with slots at predetermined points therein, keepers projecting laterally from the side walls and adapted to be received in the slots of said flanges when said side walls are disposed to their upright positions, and hook members carried on said walls adapted for engagement with said keepers to lock said side walls in their upright positions, said flexible top and bottom conforming to their outline of said side walls when the latter are disposed in the last mentioned position.

3. A collapsible crate comprising a bottom formed of flexible imperforate material, a top formed of a plurality of flexible strips hinged at their ends to the ends of said bottom, and a plurality of transverse bars connecting said strips, combined stiffening and stop flanges formed on the outer side edges of the end strips of said top and on the side edges of the bottom, said flanges terminating distances from the ends of said strips and bottom, rigid side walls hinged to the top and foldable inwardly, said flanges forming stops for the outward movement of said walls, and means for securing said side walls in their upright positions.

4. A collapsible crate comprising a bottom formed of a sheet of flexible metal, the end edges of which are designed to form knuckles, a top comprising a plurality of spaced apart flexible metal strips designed at their ends also to form knuckles for cooperation with the first mentioned knuckles on the bottom, means in connection with the knuckles of the top and bottom to hingedly secure the same together, a plurality of transverse bars secured to the strips of said top, combined stiffening and stop flanges formed on the outer side edges of the end strips of said top and also on the side edges of said bottom, said flanges terminating distances from the ends of said strips and bottom, rigid side walls hinged to the inner faces of the end strips of said top and foldable inwardly, the flanges forming stops for the outward swinging movement of said side walls, and means for securing said side walls in their upright positions.

5. A collapsible crate comprising an unbendable rectangular top having downturned flexible rectangular ends, an unbendable rectangular bottom having upturned flexible rectangular ends hingedly connected to the ends of said top, and upright foldable rigid side walls interposed between the side edges of the top and bottom.

In testimony whereof we have hereunto set our hands in presence of two subscribing witnesses.

FREDERICK T. WING.
JOHN DAYTON STIRES.

Witnesses:
E. H. STANLEY,
J. W. CURTIS.

Copies of this patent may be obtained for five cents each, by addressing the "Commissioner of Patents, Washington, D. C."